G. W. KIRKPATRICK.
GUARD FOR DIGGING IMPLEMENTS.
APPLICATION FILED JUNE 15, 1916.

1,336,630.

Patented Apr. 13, 1920.
2 SHEETS—SHEET 1.

INVENTOR
George W. Kirkpatrick
BY
his ATTORNEYS

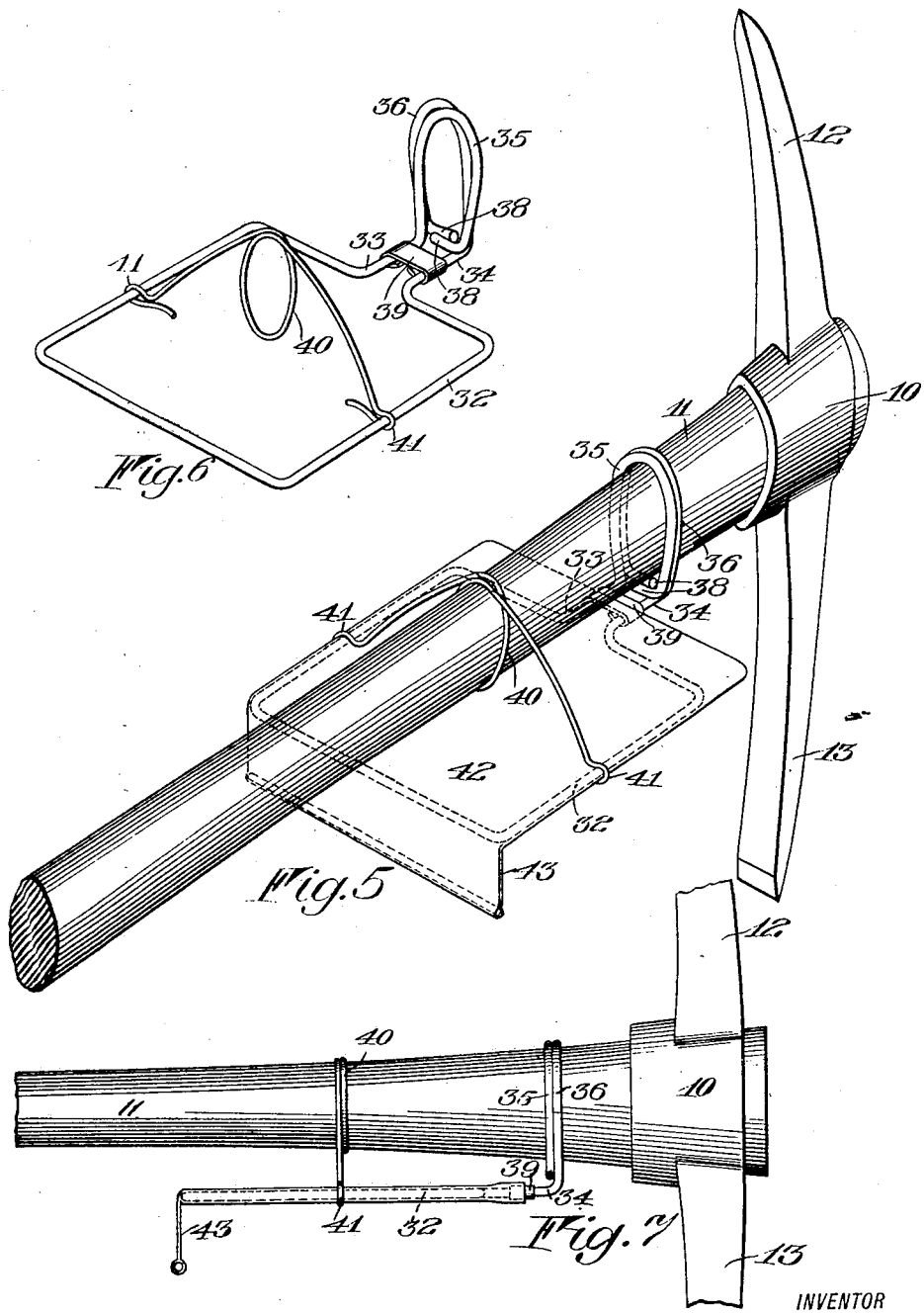

UNITED STATES PATENT OFFICE.

GEORGE W. KIRKPATRICK, OF ROCHESTER, NEW YORK.

GUARD FOR DIGGING IMPLEMENTS.

1,336,630.  Specification of Letters Patent.  Patented Apr. 13, 1920.

Application filed June 15, 1916. Serial No. 103,708.

*To all whom it may concern:*

Be it known that I, GEORGE W. KIRK-PATRICK, of Rochester, in the county of Monroe and State of New York, have invented certain new and useful Improvements in Guards for Digging Implements; and I do hereby declare the following to be a full, clear, and exact description of the same, reference being had to the accompanying drawings, forming a part of this specification, and to the reference characters marked thereon.

My invention relates to a detachable guard for digging implements and is designed more particularly for use in connection with picks, mattocks and other digging or cutting tools. One of the objects of the invention is to provide a guard adapted to be inserted upon the handle of a digging or striking implement for protecting the user thereof from the flying particles of material set in motion by striking the blade or head of the implement into various substances. A further object of the invention is to provide a guard which can be yieldingly attached to handles varying in size and shape of picks, mattocks and other digging and cutting tools. To these and other ends the invention consists in certain improvements and combinations of parts, all as will be hereinafter more fully described, the novel features being pointed out in the claims at the end of the specification.

In the drawings:

Fig. 5 is a perspective view of still another modified form of guard shown applied to the handle of a pick;

Fig. 6 is a detail perspective view of the guard shown in Fig. 5 with the cover removed therefrom, and Fig. 7 is a side elevational view showing the application of the guard to the handle of a pick.

Similar reference characters throughout the several views indicate the same parts.

Figure 4:
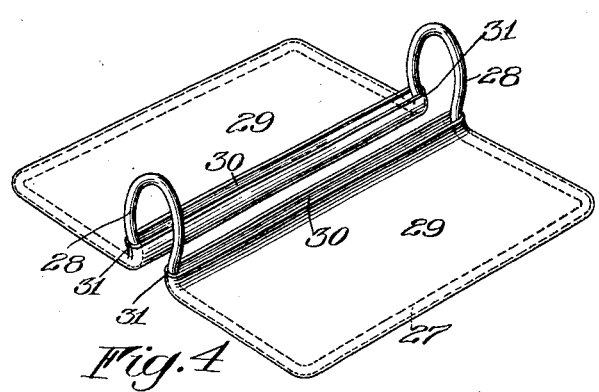
Fig. 4 is a view in perspective illustrating a modified form of guard.
Figure 1:
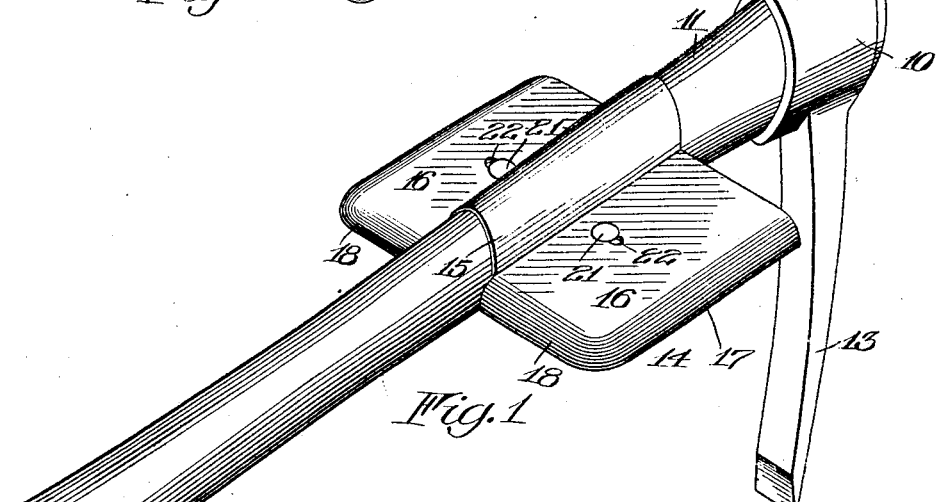
Figure 1 is a view in perspective showing one of my improved guards applied to the handle of a pick.
Figure 2:
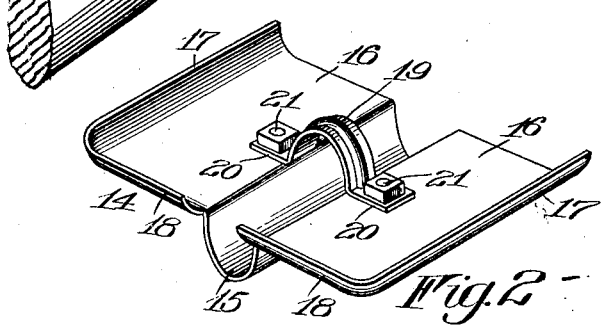
Fig. 2 is a detail perspective view of the guard shown in Fig. 1 in an inverted position.
Figure 3:
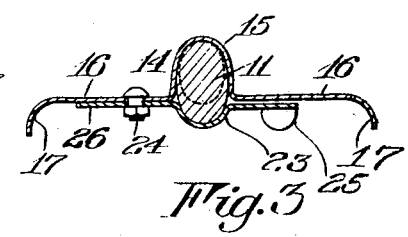
Fig. 3 is a sectional view through a guard similar to the one shown in Figs. 1 and 2 embodying a slightly modified form of locking member.

The present invention comprises a guard for the protection of the eyes, faces and clothes of persons using picks, mattocks, stone hammers and all similar tools, from flying debris, such as is thrown off from the cutting edge, point or heads of such tools when in use. The guard also serves as a protector to persons standing near or passing by the workmen using the tools particularly in the trimming or chipping of asphalt, ice and other brittle or hard substances. The guard further serves to intercept or prevent the splashing of water in cases where it is necessary to dig in water covered or saturated substances. The face of the guard is preferably positioned upon the underside of the handle to better intercept the flying particles of matter thrown off by the striking of the blades or heads of the tools into various substances. Any suitable material may be used for constructing the guard such as sheet metal, or if preferred, wire frames covered with canvas or leather or any suitable fabric material. Referring to the drawings by numerals, 10 represents a pick and 11 the handle thereof. The pick is provided with the usual blades 12 and 13 as shown in Fig. 1. Mounted upon the handle near the head of the pick is a guard 14 shown in inverted position in Fig. 2. The guard comprises a central U-shaped portion 15 adapted to engage the upper side of the handle 11 and projecting laterally from said central portion upon opposite sides thereof are the wings 16 of the guard which are adapted to intercept any flying particles of matter which may be set in motion by striking the blades of the pick into various substances such as asphalt, water soaked earth, ice, hard-pan, rock and other substances. The wings 16 are provided at their side and top edges with downwardly and outwardly extending flange portions 17 and 18 respectively, which serve to increase the effectiveness of the guard by intercepting such particles of matter as tend to fly off at the sides thereof and which would escape the top edge of the guard were the flanges 18 not provided. The guard 14 is preferably stamped of sheet metal, the U-shaped portion 15 of which forms a spring-like clamping member resiliently engaging the handle 11 of the pick. The guard is preferably applied near the top and smaller part of the handle and when pushed down to the position shown in Fig. 1, the sides of the spring-like clamping portion 15 are forced outwardly a slight amount, thereby gripping the handle and holding the guard rigidly thereon. However, to provide a positive locking means for the guard, I employ a U-shaped clamp 19, the ends 20 of which rest upon the wings 16 and are secured thereon by suitable bolts 21. Elongated apertures 22 are formed in the wings 16 to receive the bolts 21. The apertures are elongated to take care of the slight spreading of the wings due to the forcing apart of the sides of the U-shaped clamping portion 15 of the guard when the latter is forced into proper position upon the handle. In Fig. 3 I have shown a slightly modified locking member in the form of a spring 23 pivotally mounted upon a bolt 24 carried by one of the wings 16 of the guard 14. The spring 23 is adapted to clamp the handle 11 of the pick as shown in Fig. 3 when the guard is moved to its lowest position upon the handle. The locking member 23 is provided with a projection 25 by which said member is moved upon the pivot bolt 24. When the guard 14 is applied to the upper or small part of the handle indicated by the dotted line in Fig. 3, the locking member will be moved to a position at right angles to that shown in said figure so that the guard may be inserted upon the handle at the side thereof instead of being slipped on from the end. After the guard has been applied as stated the locking member is then moved upon its pivot through an angle of ninety degrees, at which time the guard is shoved down upon the larger part of the handle near the head of the pick, thereby forcing outwardly the spring 23 into clamping or locking engagement with said handle. The spring is preferably extended back of the pivot bolt 24 a considerable distance upon the wing of the guard as indicated at 26 to more effectively hold said spring in contact with the handle by affording a stronger gripping action thereon. In Fig. 4 I have shown a guard formed of a rectangular spring wire frame 27 having upstanding semi-elliptic portions 28 at two of its sides which form springs adapted to grip the sides of the handle of the pick when placed thereon. Upon the rectangular frame at opposite sides of the upstanding portions 28 are provided covers 29 formed of any suitable flexible material such as canvas, leather or cloth. The covers are preferably formed by doubling the cloth or canvas upon itself and stitching the same along two of its sides, leaving one side open as indicated at 30 so that the covers may be removably inserted upon the sides of the frame opposite the upstanding portions 28. The covers are preferably made deep enough to extend up a slight distance upon said upstanding portions as indicated at 31, to prevent accidental displacement thereof, and at the same time, force the inner edges of the covers into frictional engagement with the sides of the handle of the pick when the guard is applied thereto. It will be understood that since the frames 27 are formed of spring material that the loop portions 28 will serve to yieldingly engage the handle for holding the guard thereupon and that the frictional contact with the handle of the turned up portions of the covers will serve to increase the gripping power of the spring-like portions 28.

In Figs. 5 to 7 inclusive, I have shown another modified form of guard comprising a substantially rectangular wire frame 32. At one side of the frame the ends of the wire instead of being connected are turned outwardly a short distance as indicated at 33 and 34 and are then carried upwardly to form the loops 35 and 36 respectively. The wire forming each of the loops terminates in the inwardly extending ends 38 substantially at a point where said loops are bent upwardly from the outwardly extending portions 33 and 34 of the frame. The position of the loops before the guard is inserted upon the handle of the pick is shown in Fig. 6 and in this figure the clear space between the opposite sides of the two loops is somewhat less than the thickness of the handle at the point where said loops engage the handle in Fig. 5. In other words, the top of the loop 35 is set over a little to the right of the center line of the frame, while the top of the loop 36 is set over a little to the left of said center line, so that the small end of the pick handle may readily be extended through the loops, but as the guard is pushed down upon the handle to the position shown in Fig. 5 said loops will be forced outwardly into clamping engagement with the sides of the handle. The portions 33 and 34 of the frame 32 are held against outward displacement by a tie 39 as shown in Figs. 5 and 6. In order to prevent undue vibration of the frame 32 upon the handle of the pick, I provide a brace, preferably formed of a wire looped at 40 to yieldingly engage said handle, the opposite ends of the wire being extended to the sides of the frame and connected therewith as indicated at 41 in Fig. 6. A cover 42, preferably formed of canvas or other flexible material, is provided for the frame 32 as shown in Fig. 5. Depending from the top sides of the frame is a curtain 43 preferably formed by continuing beyond the frame a suitable distance, the flexible material forming said cover. However, said curtain may be detachably connected to the frame independently of the cover if desired. The curtain 43 is intended to intercept such particles of flying debris as would escape the upper edge of the guard proper. The object of spacing the guard from the handle of the tool as shown in Fig. 7 is to provide additional clearance for the free movement of the hands of those who use said tools.

I claim as my invention:

1. A guard for digging implements comprising a body portion having a pair of wings and means for detachably securing it to the handle of the implement with the wings projecting laterally therefrom in a plane substantially parallel with the axis thereof, said securing means comprising a yieldable clamp embracing and firmly engaging the handle.

2. The combination with an implement comprising a handle and a tool extending transversely thereof with its working portion at one side of the axis of said handle, of a guard comprising a substantially plane-shaped body portion having means for detachably securing it to said handle so as to project therefrom in a plane substantially parallel with the axis thereof, said securing means comprising a yieldable clamp embracing and firmly engaging said handle.

3. A guard for the handle of a digging implement comprising a substantially plane-shaped body formed adjacent its center with a resilient U-shaped portion adapted to be adjustably clamped on said handle with said guard body in a plane substantially parallel with the axis of said handle, and means for adjustably and detachably securing said body on said handle comprising a resilient clamp embracing and securing said handle in said U-shaped portion of the guard body.

GEORGE W. KIRKPATRICK.

Witnesses:
 FRANCIS JERDONE, Jr.,
 HARRIET T. VAY.